United States Patent [19]

Schmukler et al.

[11] Patent Number: 4,600,746

[45] Date of Patent: Jul. 15, 1986

[54] POLYVINYL ALCOHOL ALLOYS AND METHOD OF MAKING THE SAME

[75] Inventors: Seymour Schmukler, Palatine; Mitsuzo Shida, Barrington; John Machonis, Jr., Schaumburg, all of Ill.

[73] Assignee: Norchem, Inc., Rolling Meadows, Ill.

[21] Appl. No.: 786,513

[22] Filed: Oct. 11, 1985

Related U.S. Application Data

[62] Division of Ser. No. 578,111, Feb. 8, 1984, Pat. No. 4,575,532.

[51] Int. Cl.$^4$ .............................................. C08L 29/04
[52] U.S. Cl. ................................ 525/57; 264/176 R; 264/500
[58] Field of Search .............. 525/57; 264/176 R, 500

[56] References Cited

U.S. PATENT DOCUMENTS

| | | | |
|---|---|---|---|
| 3,642,726 | 2/1972 | Heilman | 525/384 |
| 3,645,939 | 2/1972 | Gaylord | 525/57 |
| 3,674,896 | 7/1972 | Purcell et al. | 525/57 |
| 3,732,337 | 5/1973 | Heilman | 525/57 |
| 3,780,085 | 1/1974 | Kishimoto et al. | 525/57 |
| 3,847,728 | 11/1974 | Hirata et al. | 525/57 |
| 3,931,449 | 1/1976 | Hirata et al. | 525/57 |
| 3,932,692 | 1/1976 | Hirata et al. | 525/57 |
| 3,975,463 | 8/1976 | Hirata et al. | 525/57 |
| 4,293,473 | 10/1981 | Eastman | 525/57 |
| 4,338,417 | 7/1982 | Heslinga et al. | 525/197 |
| 4,349,644 | 7/1982 | Iwanami et al. | 525/57 |
| 4,382,128 | 5/1983 | Li | 524/513 |

FOREIGN PATENT DOCUMENTS

| | | |
|---|---|---|
| 2522670 | 9/1983 | France . |
| 52-062362 | 5/1977 | Japan . |
| 52-103480 | 8/1977 | Japan . |
| 52-107044 | 9/1977 | Japan . |
| 55-127450 | 10/1980 | Japan . |

OTHER PUBLICATIONS

Polymer Science and Technology, ed. by Klemper et al., 1977, preface, pp. v–vi.

Rogers, C. E., Multiphase Polymer Materials, incomplete article, pp. 1–4, date unknown.

*Primary Examiner*—Allan M. Lieberman
*Attorney, Agent, or Firm*—Wood, Dalton, Phillips, Mason & Rowe

[57] ABSTRACT

A polyvinyl alcohol alloy useful as a gas barrier material is prepared by reacting polyvinyl alcohol and a functional polymer to provide a product which has low gas permeability and water absorptivity characteristics, and which has a melting point sufficiently below its decomposition point to allow melt extrusion. The alloy may optionally be mixed with a polyolefin blending resin.

20 Claims, 4 Drawing Figures

POLYVINYL ALCOHOL ALLOYS AND METHOD OF MAKING THE SAME

CROSS-REFERENCE TO RELATED APPLICATION

This is a division of co-pending, commonly assigned application Ser. No. 578,111 filed Feb. 8, 1984, now U.S. Pat. No. 4,575,532.

BACKGROUND OF THE INVENTION

1. Field of the Invention

This invention relates generally to polyvinyl alcohol alloys which have desirable physical characteristics including low gas permeability, low moisture absorptivity, and relatively low melting points.

2. Description of the Prior Art

Polyvinyl alcohol (PVA) has the lowest gas permeability of any polymer yet synthesized, and has found widespread application as a gas barrier material, especially as an oxygen barrier material. Commercial polyvinyl alcohols have several failings, however. Due at least in part to their high polarity, their melting points are close to their decomposition points and, thus, they are not melt extrudable. Most films are cast from water or use large percentages of a polyhydric alcohol or polyethylene oxide (with or without added water) to plasticize the melt so that extrusion can be effected. Prior PVA polymers absorb relatively large quantities of moisture. The presence of moisture in turn raises the oxygen permeability of the polymers drastically.

One approach known in the art to alleviate these difficulties has been to introduce hydrocarbon units, especially ethylene units, into the chain of the polymer. The resulting materials are known as ethylenevinyl alcohol (EVOH) copolymers. EVOH copolymers have been used very successfully in a number of commercial applications, but are quite expensive. In addition, close control of composition and elimination of homopolymer by-products are required in the production of EVOH copolymers. A broad distribution of ethylene results in poor water vapor transmission rate properties. The presence of homopolymer leads to a tendency to develop gel specks and/or burn spots during the extrusion process.

SUMMARY OF THE INVENTION

The present invention is directed to overcoming one or more of the problems described above by providing a polyvinyl alcohol material having excellent gas barrier characteristics without high sensitivity to water.

According to the present invention, a novel polyvinyl alcohol alloy that is relatively inexpensive, has a melting point below its decomposition point so as to allow melt extrusion, and has reduced moisture absorption characteristics, and a method of making such an alloy, are provided.

The inventive method comprises the step of reacting polyvinyl alcohol which is less than about 98 mole percent hydrolyzed with less than a stoichiometric amount of a functional polymer which is a polyolefin incorporating reactive functional groups, to produce a mixture of grafted and ungrafted polyvinyl alcohol. The functional groups may be grafted to the polyolefin or incorporated into the polyolefin chain.

The mixture of grafted and ungrafted polyvinyl alcohol can optionally be melt blended with a compatible polyolefin blending resin to produce an alloy having desired gas barrier, low water vapor transmission, low water sensitivity, and processability characteristics.

DETAILED DESCRIPTION OF THE INVENTION

General Description

Figure 1:
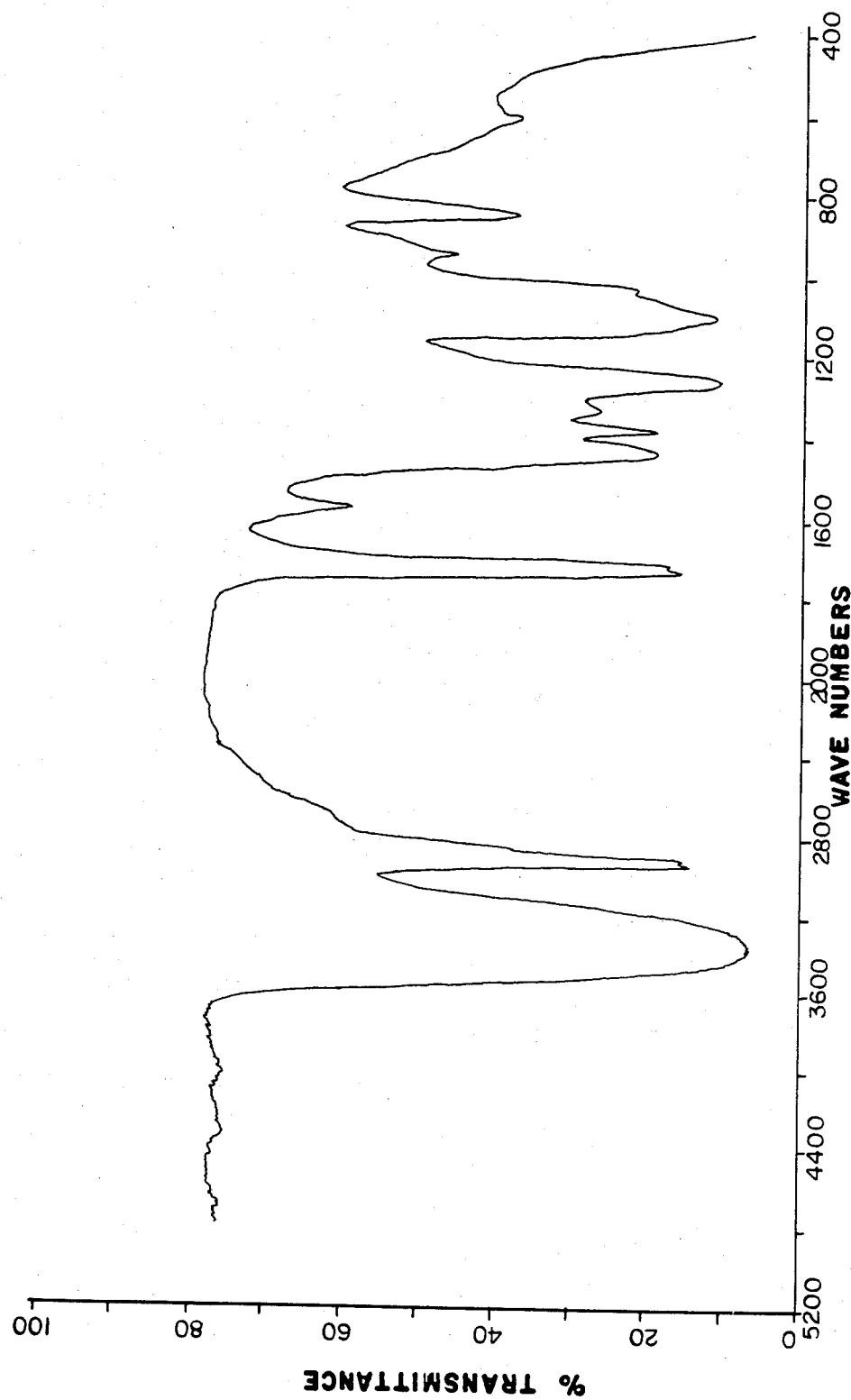
FIG. 1 is a Fourier Transform Infrared (FTIR) spectrum of a polyvinyl alcohol which is 87 mole percent hydrolyzed and which has a 4% aqueous solution viscosity of about 5 cps at 20° C.

Polyvinyl alcohol (PVA) polymers and copolymers are highly polar; and the high hydroxyl content of such polymers render them effective as gas barrier materials. Unfortunately, however, this high hydroxyl content results in very high moisture sensitivity of these materials.

By the method of the invention, desirable moisture resistance characteristics attributable to hydrocarbons are introduced into PVA polymers while retaining the desirable gas barrier characteristics associated with high hydroxyl content.

This is accomplished by providing a physical mixture of grafted and ungrafted PVA and, optionally, melt blending this mixture with a compatible olefin homopolymer or copolymer blending resin.

The mixture of grafted and ungrafted PVA is produced by reacting a quantity of ungrafted PVA with an olefin polymer having functional groups reactive with the hydroxyl groups of the PVA. The backbone of the functional polymer is an olefin homopolymer or copolymer, and the monomer containing functional groups may comprise part of the backbone or be present as side chains. The amount of the functional polymer is selected such that substantially less than all the available hydroxyl groups on any given PVA chain are reacted, and such that a substantial proportion of the available PVA chains remain ungrafted.

If too high a proportion of available hydroxyl groups are reacted, the mixture will be rendered unprocessable, due to an extreme rise in viscosity and a decrease in melt index (MI) resulting from cross-linking and gelling of the PVA.

It has been found that such limited grafting of PVA to provide a physical mixture of grafted and ungrafted PVA results in an alloy material exhibiting excellent moisture resistance and good separation of the melting and decomposition points, without a significant loss of gas barrier properties.

Melt blending of the mixture of grafted and ungrafted PVA with a compatible polyolefin blending resin results in the addition of increased hydrocarbon characteristics to the blend, thus increasing moisture resistance, while retaining desirable processability characteristics.

The Polyvinyl Alcohol Polymer

Polyvinyl alcohol polymers suitable for use in this invention are polyvinyl alcohol homopolymers or copolymers having a degree of hydrolysis of less than about 98 mole percent. (PVA polymers having a degree of hydrolysis greater than about 98 mole percent result in products having melting points sufficiently close to their decomposition points that melt processing is unfeasible.) Preferably, the PVA should be between 70 and 90 mole percent hydrolyzed and have a degree of polymerization (DP) of between about 300 and 900. Other PVA polymers, however, are also suitable.

The Functional Polymer

Suitable functional polymers comprise any polyolefins which incorporate functional groups reactive with the hydroxyl groups of the PVA. Suitable functional groups include carboxylic acids, carboxylic acid anhydrides, metal salts of a carboxylic acid, derivatives thereof, or mixtures. Suitable examples are graft copolymers based on an olefin homopolymer or copolymer backbone. Particular polyolefins suitable for use as graft copolymer backbones in this invention include polyethylene, ethylene copolymers, polypropylene, and propylene copolymers.

Other copolymers useful as graft copolymer backbones include olefin-ester copolymers such as ethylene-vinyl acetate, other ethylene-vinyl esters, ethylene-acrylate esters and ethylene-methacrylate ester copolymers.

Specific examples of suitable functional polymers include polyethylene and polypropylene homopolymers or copolymers grafted with maleic anhydride, ethylene-acrylic acid or ethylene-methacrylic acid random copolymers or ethylene-acrylic acid or ethylene-methacrylic acid ionomers, and ethylene-propylene rubbers grafted with fumaric acid.

Any unsaturated carboxylic acid or carboxylic acid anhydride can be used to form polyolefin graft copolymers suitable for use in this invention. Some of these are maleic anhydride, x-methyl bicyclo(2.2.1)-hept-5-ene-2,3-dicarboxylic anhydride (XMNA), bicyclo(2.2.1)hept-5-ene-2,3-dicarboxylic anhydride, citraconic anhydride, itaconic anhydride, and 1,4-butenedioic acid monoalkyl esters. Dicarboxylic acids, monoester acid derivatives, or maleamic acids which can form these anhydrides or anhydride derivatives can also be used.

The carboxylic acid, anhydride, metal salt or other carboxylic acid derivative need not be grafted onto the polyolefin backbone of the functional polymer, but may be incorporated into the chain by copolymerization. Examples of copolymers suitable for use as acid functional polymers are ethylene-acrylic acid, ethylenemethacrylic acid, ethylene-alkyl acrylate-acrylic acid copolymers or ethylene-alkyl methacrylate-methacrylic acid copolymers and their partially neutralized salts (known as ionomers). Other useful copolymers are ethylene-vinyl acetate-maleic anhydride, ethylene-methylacrylate-maleic anhydride, ethylene-methylmethacrylatemaleic anhydride, ethylene-maleic anhydride, ethylenemonoester of maleic acid, ethylene-vinyl acetate-1,4-butenedioic acid and its monoester, ethylene-alkyl acrylate-1,4-butenedioic acid and its monoester copolymers, and many other olefin combinations containing acid functionality like the partially neutralized metal salt derivatives of these copolymers and maleamic acid derivatives.

The Blending Resin

The blending resin is an olefin homopolymer or copolymer which is compatible with the mixture of grafted and ungrafted PVA. Suitable blending resin polymers include, but are not limited to, high-, low- and medium density polyethylene, propylene homopolymers and copolymers of propylene and ethylene, including block and random ethylene-propylene copolymers and ethylene-propylene elastomers, and copolymers of ethylene with olefins such as hexene-1, octene-1 and butene-1, including those copolymers known as linear low density polyethylene, for example.

The Nature of the Alloy and Proportions of Constituents

Figure 2:
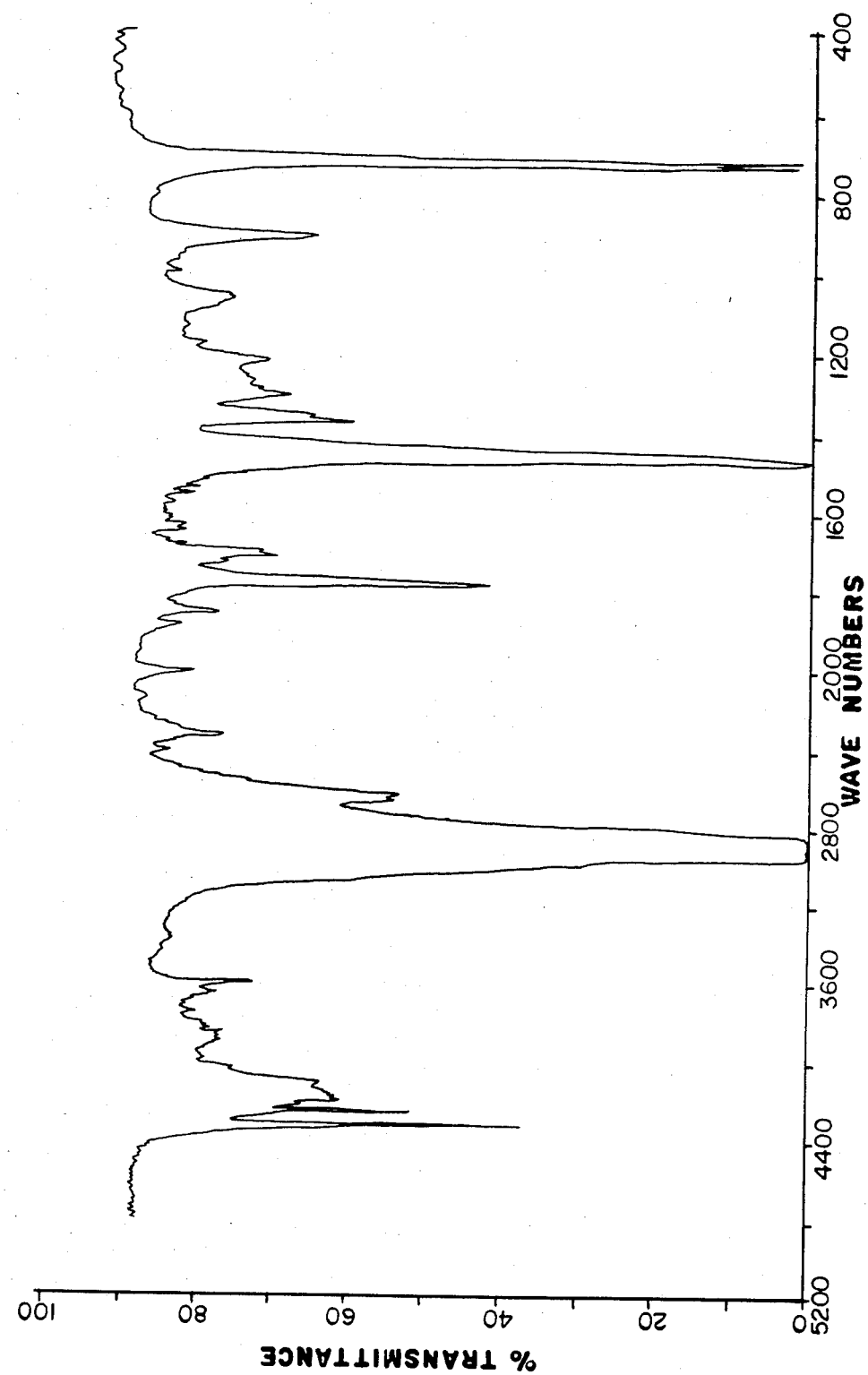
FIG. 2 is an FTIR spectrum of a graft copolymer comprising a polyethylene backbone grafted with x-methyl bicyclo(2.2.1)hept-5-ene-2,3-dicarboxylic anhydride (XMNA)
Figure 3:
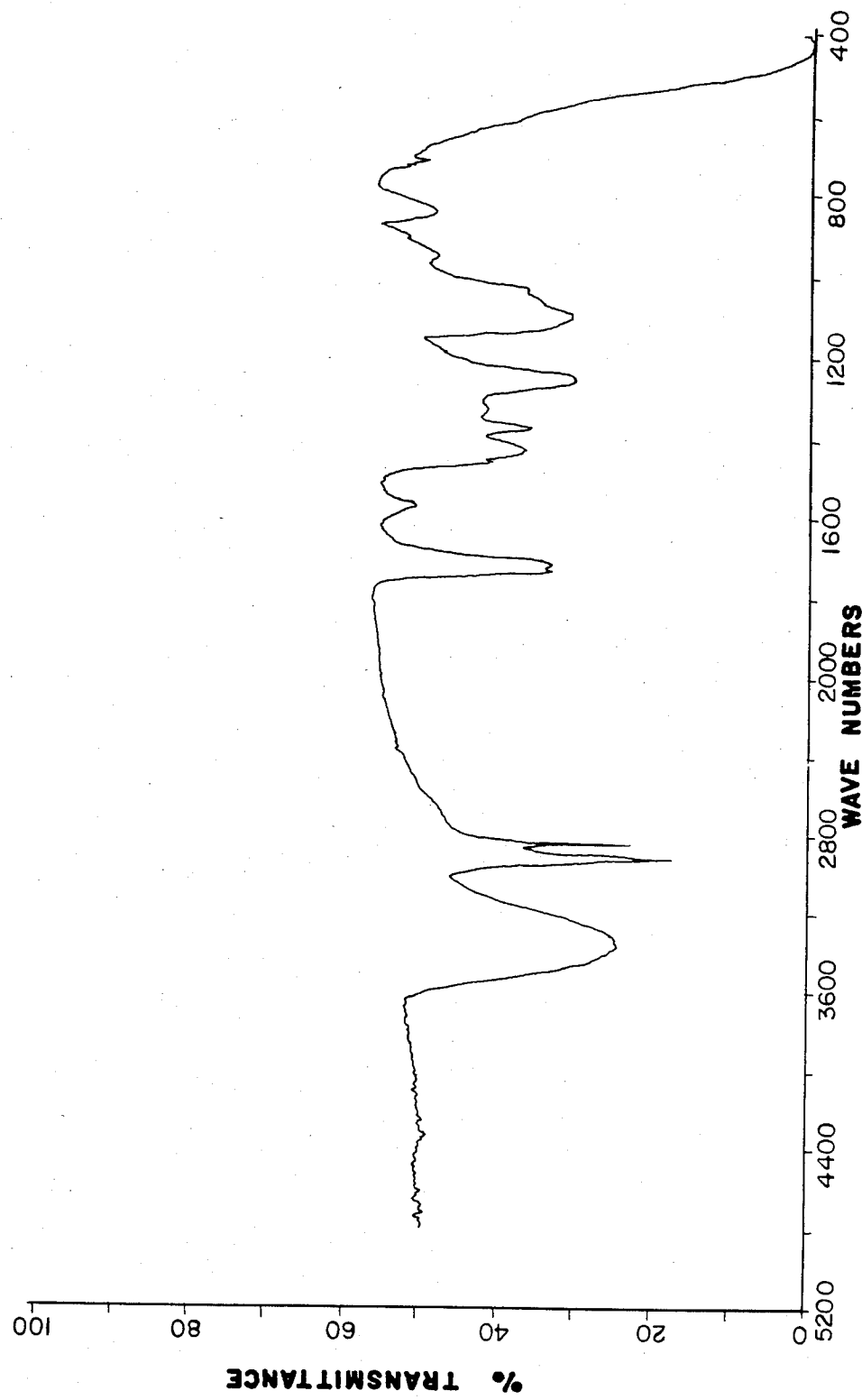
FIG. 3 is an FTIR spectrum of a reaction product of the compounds of FIGS. 1 and 2; and, FIG. 4 is an FTIR spectrum representing the subtraction of the spectra of FIGS. 1 and 2 from that of FIG. 3.
Figure 4:
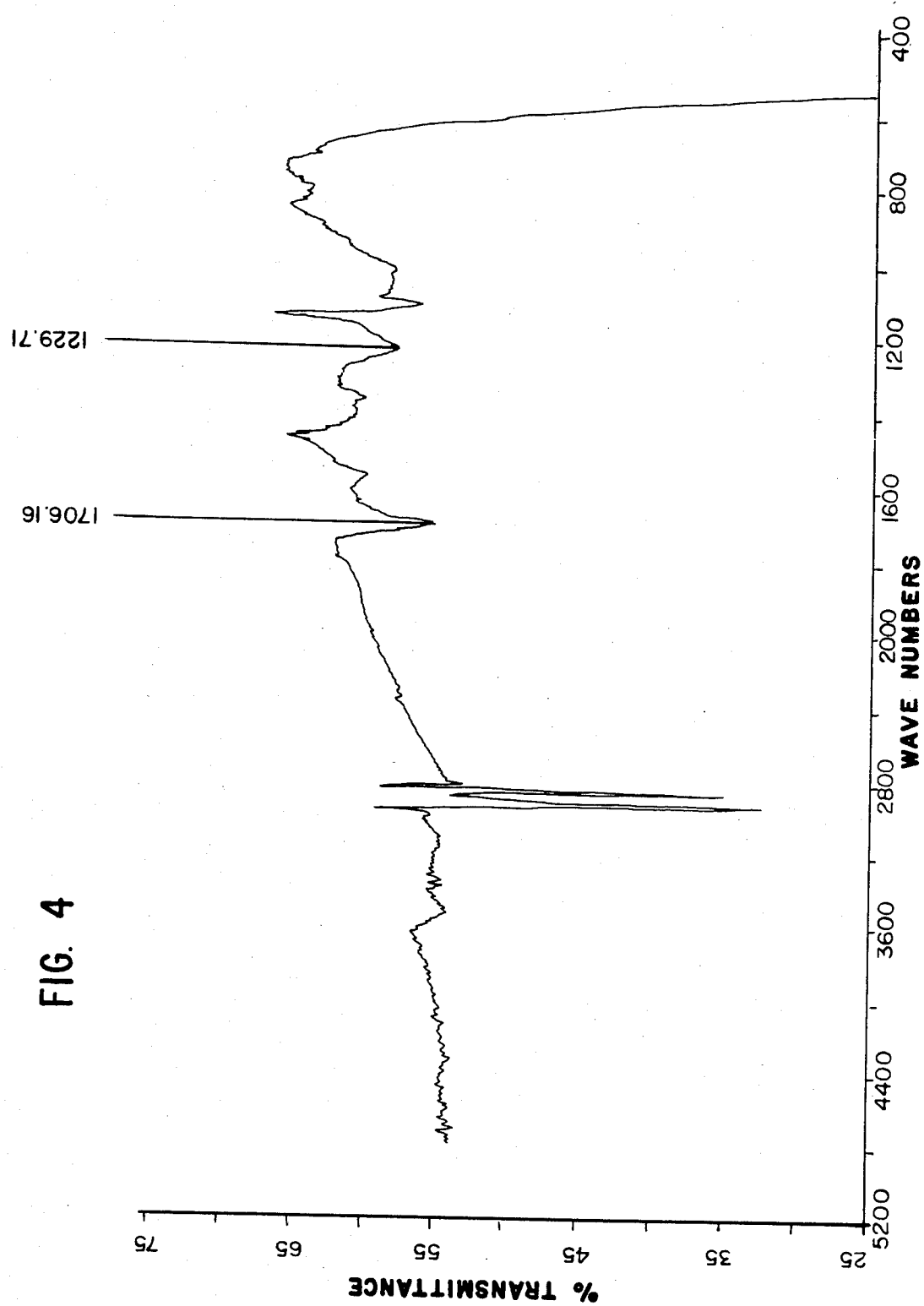

Fourier Transform Infrared (FTIR) spectral analysis of typical alloys and alloy-forming reactants of the invention shows the disappearance of anhydride and the appearance of a new ester in the alloy at about 1225 $cm^{-1}$ to 1230 $cm^{-1}$. This new ester can be distinguished from the acetate ester resulting from unhydrolyzed acetate in the polyvinyl acetate homopolymers or copolymers from which the polyvinyl alcohols are prepared (see FIGS. 1–4). This demonstrates that a new material is formed, and that this material is a reaction product (i.e. a graft copolymer between the PVA and the functional polymer) as opposed to a mere physical association between the PVA and copolymer.

The functional level of the functional polymer is defined by the amount of carboxylic acid, anhydride, metal salt or derivative contained therein. If the functional level is too low, the reaction product will not give a useful alloy when blended with the polyolefin polymer. On the other hand, if the functional group level is too high, the viscosity of the blended product becomes so high as to hinder its practical processability. We do not wish to be held to this theory, but one possible reason for decreased flow characteristics could be chain extension and/or cross linking of the PVA by reaction with the functional polymer.

The PVA-functional polymer reaction product acts as a compatibilizer to allow optional incorporation of a polyolefin blending resin into the reaction product to form other useful alloys. The presence of unreacted polyolefin blending resin as part of a physical mixture with the PVA alloy allows one to select the proportion of added blending resin and thus balance moisture resistance and gas barrier properties as desired. Without the polyolefin-grafted PVA, the addition of a polyolefin to a melt blend would result in macrophase separation, as demonstrated in the Examples, below.

In the alloys of the invention, microphases may exist without observable macrophase separation. As a result, the alloys may exhibit the appearance and behavior of single phase, homogeneous polymer blends.

The proportion of grafted PVA to ungrafted PVA, and the proportion of polyolefin blending resin to the mixture of grafted and ungrafted PVA, can be readily empirically determined by one skilled in the art. In general, the proportion of functional polymer in the alloy is selected to provide both a desired level of moisture resistance and desired gas barrier properties. The proportion of functional polymer should be sufficient to separate the melting and decomposition points of the alloy so as to allow melt processing, yet insufficient to result in gelling.

For example, if the functional polymer is an HDPE homopolymer grafted with 1.5 wt. % XMNA, the alloy should comprise at least about 70 wt. % PVA, in order to obtain a processable alloy and desired gas barrier properties.

If present, the compatible blending resin can comprise between about 1 and 15 wt. % of the alloy. The upper limit of the blending resin proportion is dictated by (1) desired gas barrier characteristics and water resistance properties and (2) the amount of functional polymer in the PVA mixture. This can be readily empirically determined, and the use of too high a proportion of blending resin results in observable macrophase separation, as shown in the Examples, below.

The foregoing specific values are based on the use of HDPE homopolymer grafted with 1.5 wt. % of XMNA as the functional polymer. It will be appreciated that the properties of the alloy and the proportions of constituents vary with the choice of functional groups, functional polymer backbone, polyolefin blending resin, the hydroxyl content of the PVA polymer, and the molecular weight and melt index of each of the PVA polymer and the functional polymer.

Moisture pickup measurements show that the functional polymer hydrocarbon chains lower the moisture pickup of the alloys (see Table II below). Since oxygen permeability is affected by the amount of moisture absorbed, these alloys will have reduced oxygen permeability under high moisture conditions. Oxygen permeability measurements on dry PVA alloys show that they have excellent barrier properties against oxygen. The alloys have impermeability at least 100 times better than Mylar ® resins (oriented polyethylene terephthalate), and nylon 6, which have heretofore been used in some barrier structures.

Gas barrier films, sheets, tubings, coatings, bottles, profiles, etc. can be formed from these alloys by blown and cast extrusion, extrusion coating, coextrusion, coextrusion coating, injection molding, blow molding, rotomolding, compression molding, profile, pipe and tubing extrusion or a combination of these processes. These articles can be fabricated into pouches, bottles, pipe, tubing and other fabricated articles. Other shapes, articles and methods of fabrication for thermoplastics, blends and alloys obvious to one skilled in the art are also included.

EXAMPLES

The following specific examples are intended to illustrate the invention, but the scope of the invention is not to be considered to be limited thereby.

EXAMPLE 1

(a) 50 wt. % PVA (DP=330, 35 mole % hydrolyzed) and 50 wt. % HDPE graft copolymer (graft monomer=XMNA, 1.5 wt. % incorporated, MI=1.5 g/10 min.) were reacted in a Brabender mixer at 325° F. (163° C.) for 5 min. at 120 rpm. The reaction product, through use of FTIR spectral subtraction, shows the presence of bands at 1750 cm$^{-1}$ (carbonyl) and 1225 cm$^{-1}$ (carbon-oxygen) which can be related to an ester other than acetate.

(b) 80 wt. % PVA (87 mole % hydrolyzed, 4% aqueous solution viscosity at 20° C. of 5 cps) and 20 wt. % of the graft copolymer described in part a) above were blended in a Brabender mixer at 425° F. (218° C.) for 5 minutes at 120 rpm. The reaction product, through use of FTIR spectral subtraction, shows the presence of a band at 1229 cm$^{-1}$ (carbon-oxygen) which can be related to an ester other than acetate (see FIGS. 1-4).

EXAMPLE 2

30 wt. % PVA (DP=700, 74 mole % hydrolyzed) and 5 wt. % of the graft copolymer as described in Example 1 were reacted in the presence of 65 wt. % of an ethylene-butene-1 copolymer (MI=2, density=0.918 g/cc). The amount of anhydride found by FTIR is 0.014 wt. %. The amount of anhydride which would be present if no reaction occurred is 0.065 wt. %.

EXAMPLE 3

Alloys with the compositions listed in Table I, below, based on PVA "A" (87 mole % hydrolyzed, $M_w$=10,000, 4% aqueous solution viscosity of 5 cps), PVA "B" (74 mole % hydrolyzed, DP=600), and the graft copolymer described in Example 1, were submitted for FTIR analysis as described in Example 2. The results show that most of the anhydride of the graft copolymer has disappeared. The theoretical percent of anhydride in Table I shows the amount which would be present if no reaction occurred.

TABLE I

| | Example 3 | | | |
|---|---|---|---|---|
| | Polyolefin Graft | | Anhydride | |
| PVA "A" % | Copolymer % | PVA"B" % | Observed % | Theoretical % |
| — | 20 | 80 | 0.06 | 0.28 |
| — | 40 | 60 | 0.13 | 0.56 |
| 80 | 40 | — | 0.03 | 0.56 |
| 60 | 20 | — | 0 | 0.28 |

EXAMPLE 4

70-95 wt. % of the PVA and correspondingly 30-5 wt. % of the polyolefin graft copolymer used in Example 1, 5000 ppm of Irganox 1010 (tetrakis [methylene(3,5-di-tert-butyl-4-hydroxyphenyl propionate)]methane from Ciba-Geigy) and 500 ppm of calcium stearate were reacted in an intensive mixer, using a steam heated rotor, for a period of 4-5 minutes. The material was reacted at 430°-450° F. (221°-232° C.).

The reaction products obtained were extruded into films of various thicknesses by use of a single screw extruder with a temperature profile of:

Zone 1=365°-380° F. (185°-193° C.)
Zone 2=405°-440° F. (207°-227° C.)
Zone 3=400°-440° F. (204°-232° C.)

Reaction products from 80 wt. % PVA and 20 wt. % of a polyolefin graft copolymer (prepared by grafting XMNA onto HDPE) were extruded into 3 mil film. These along with those made from 100% PVA "A" and "B", respectively, were dried in a vacuum oven to constant weight. They were then placed in desiccators in which the atmosphere was controlled at 50% and 79.5% relative humidity, respectively. The films were weighed after remaining in these atmospheres for eight days. The percent weight gains are shown in Table II, below.

TABLE II

Example 4
PERCENT MOISTURE GAIN[1][4]

| | Relative Humidity | |
|---|---|---|
| | 50% | 79.5% |
| PVA "A"[2] | 8.7 | 14.7 |
| Reaction Product "A"[5] | 5.0 | 9.9 |
| Reaction Product "C"[6] | 4.4 | 10.5 |
| PVA "B"[3] | 4.7 | 10.0 |
| Reaction Product "B"[5] | 3.5 | 8.3 |

Notes:
[1] 3 mil film, weight gain after 8 days under the specified conditions.
[2] PVA "A" is 87 mole % hydrolyzed, $M_w$ = 10,000; 4% aqueous solution viscosity at 20° C. of 5 cps.
[3] PVA "B" is 74 mole % hydrolyzed, DP = 600.
[4] The graft copolymer used to prepare the reaction products contains 1.5 weight percent x-methyl bicyclo (2.2.1)hept-5-ene-2,3-dicarboxylic anhydride (XMNA) and has a melt index of 1.5 g/10 min. The backbone polymer which is grafted has the following properties: density = 0.96 g/cc and high load melt index = 3 g/10 min.
[5] The reaction products contain 80% of the corresponding PVA and 20% of the graft copolymer.
[6] Reaction product "C" contains 80% of PVA "A", 10% of a linear low density polyethylene (LLDPE) composed of ethylene and butene-1 which has a density of 0.918 g/cc and a melt index (MI) of 2 g/10 min and 10 wt. % of the graft copolymer described in note 4, above.

EXAMPLE 5

PVA/functional polymer reaction products were also made using the PVA polymers listed below.

TABLE III

Example 5

| DP[1] | Visc.[2] | Mole % Hydrolyzed | $M_n$ | $M_w$ |
|---|---|---|---|---|
| 500–700 | 4–6 | 87.0–89.0 | 22,000–31,000 | — |
| 1750–1800[3] | 28–32 | 99.7+ | — | — |
| 500–700[3] | 5–7 | 98.0–98.8 | 22,000–31,000 | — |
| | 4–6 | 88.7–85.5 | — | 10,000 |
| | 2.4–3 | 77–72.9 | — | 3,000 |
| | 1.8–2.4 | 77–72.9 | — | 2,000 |
| 850 | — | 73 | — | — |
| 700 | — | 73 | — | — |
| 600 | — | 74 | — | — |
| 650 | — | 37 | — | — |
| 330 | — | 35 | — | — |

Notes:
[1] Degree of polymerization.
[2] Viscosity (in centipoise) of a 4% aqueous solution at 20° C.
[3] Thermal decomposition occurs.

The results shown in Table III demonstrate that PVA polymers having a degree of hydrolysis greater than about 98 mole percent do not form useful alloys according to the present invention.

Other anhydride-containing functional polymers which were studied include:

1. A graft of XMNA onto an ethylene-butene-1 copolymer (linear low density PE with a high load melt index (HLMI) of 2.6 g/10 min and density=0.917 g/cc), content of XMNA=1.4 wt. %, MI=1 for the graft copolymer.
2. An EVA containing 14% vinyl acetate and 0.29% of maleic anhydride and a melt index (MI)=6–8.
3. A graft of XMNA onto an EVA containing 28% vinyl acetate, MI=6. Content of XMNA=0.87 wt. % and MI of graft copolymer=1.2.
4. A graft of maleic anhydride (MA) onto HDPE. Content of MA is 1.02 wt. %.

EXAMPLE 6

This example shows the decrease in melt flow rate (MFR) found when the proportion of functional polymer in the reaction product is increased.

A reaction of the polyolefin graft copolymer described in Example 1 with modified PVA, as described in Table IV, below, is performed at 425° F. (218° C.) for 5 min. in an electrically heated scroll mixer (e.g. a Brabender mixer). The melt flow rates (MFR) are taken at 230° C. using a 2160 g weight as described in ASTM 1238 (Condition L).

TABLE IV

Example 6
Effect of Functional Polymer Concentration On Processibility[3]

| PVA "A"[1] % | Polyolefin Graft Copolymer[2] % | MFR[4] |
|---|---|---|
| 100 | — | 21.4 |
| 95 | 5 | 19.3 |
| 80 | 20 | 5.3 |
| 70 | 30 | 0.65 |
| 60 | 40 | 0.12 |
| PVA "B"[1] % | | |
| 100 | — | 9.8 |
| 90 | 10 | 4.6 |
| 85 | 15 | 2.4 |
| 80 | 20 | 1.3 |
| 70 | 30 | 0.2 |
| 60 | 40 | 0.0 |

Notes:
[1] PVA "A" and "B" as in Example 3.
[2] Graft copolymer as in Example 3.
[3] All samples reacted at 425° F. for 5 min.
[4] ASTM 1238 (Condition L) - 230° C., 2160 g.

EXAMPLE 7 (COMPARATIVE)

Varying percentages of non-grafted PVA, as designated in Table V, below, and an ethylene-butene-1 copolymer (linear low density polyethylene-LLDPE) with an MI of 2 g/10 min. and a density of 0.918 g/cc were blended in an electrically heated scroll mixer at 425° F. (218° C.) for 5 min. at 120 rpm. Gross macrophase separation was observed in which the macrophases were different in color and behavior. The smaller macrophase is indicated as percent separated in Table V, below. These data show that the blends of PVA with LLDPE are not macroscopically homogeneous.

TABLE V

Example 7

| PVA "A" % | PVA "B" % | LLDPE % | Separation % |
|---|---|---|---|
| 95 | 0 | 5 | 1.8 |
| 90 | 0 | 10 | 3.6 |
| 85 | 0 | 15 | 8.0 |
| 70 | 0 | 30 | 15.0 |
| 0 | 95 | 5 | 2.1 |
| 0 | 90 | 10 | 5.0 |
| 0 | 85 | 15 | 7.0 |
| 0 | 70 | 30 | 13.8 |

EXAMPLE 8

A number of reaction products were prepared using 20 wt. % of the polyolefin graft copolymer used in Example 1 combined with various amounts of the LLDPE described in Example 7, and PVA "A" as described in Example 4. The results are shown in Table VI, below. No macrophase separation occurs. This demonstrates the utility of the reaction product (the PVA alloy formed in situ) for compatibilization of PVA with LLDPE.

TABLE VI

| | Example 8 | | | |
|---|---|---|---|---|
| PVA "A" % | Polyolefin Graft Copolymer % | LLDPE % | Sepn.[1] % | MFR[2] g/10 min. |
| 75 | 20 | 5 | 0 | 3.9 |
| 70 | 20 | 10 | 0 | 1.9 |
| 65 | 20 | 15 | 0 | 1.4 |

[1] See Example 6.
[2] ASTM 1238 (Condition L) 230° C., 2160 g.

EXAMPLE 9

PVA alloys were prepared by reacting 90, 80 and 70 wt. %, respectively, of PVA "A" described in Example 4 with appropriate amounts of an ethylene copolymer (MI=6.5, 14 wt. % vinyl acetate and 0.29 wt. % maleic anhydride) in the presence of 5000 ppm of Irganox 1010 and 500 ppm of calcium stearate. The alloys obtained can be extruded into clear films.

EXAMPLE 10

PVA alloys were prepared by reacting 80 and 70 wt. %, respectively, of a PVA with a DP of 500–700, $M_n$=22,000–31,000 and which is 87 mole percent hydrolyzed with the ethylene graft copolymer described in Example 1. The reaction products so obtained are well dispersed without macrophase separation.

EXAMPLE 11

The oxygen permeability of PVA "A", PVA "B", and their alloys as described in Example 3 were measured at room temperature (22°–24° C.) using an "Ox-Tran 100" oxygen permeability measurement device (Mocon Modern Controls, Inc., Elk River, Minn.) and compared with Mylar ® and nylon 6 films according to ASTM D-3985-81. The results are shown below in Table VII.

TABLE VII

| | Example 11 | | |
|---|---|---|---|
| PVA "A" % | PVA "B" % | Polyolefin Graft Copolymer % | Oxygen Permeability (cc-mil/m² · 1 da. 1 atm) |
| 100 | 0 | 0 | 0.3 |
| 80 | 0 | 20 | 0.36 |
| 0 | 100 | 0 | 21.3 |
| 0 | 80 | 20 | 44.1 |
| Mylar ® (oriented PET) | | | 55 |
| Nylon 6 | | | 40 |

EXAMPLE 12

90 wt. % of PVA "A" described in Example 3 is blended with 10 wt. % of a high density polyethylene copolymer (HDPE) with a density of 0.949 g/cc and a high load melt index of 20 under the same conditions as described in Example 8. At least 7.5% of the material can be distinguished as a separate macrophase.

EXAMPLE 13

An alloy was prepared in situ by using 80 wt. % of PVA "A", 10% of an ethylene-hexene-1 copolymer with a density of 0.949 g/cc and a high load melt index (HLMI) of 20 g/10 min, and 10 wt. % of the polyolefin graft copolymer described in Example 1 under the conditions described in Example 7.

EXAMPLE 14

The HDPE in Example 12 is replaced by low density polyethylene homopolymer (LDPE) with a density of 0.919 g/cc and an MI of 2.5. At least 4 wt. % of the material is observed as a separate macrophase.

EXAMPLE 15

An alloy was prepared in the same manner as described in Example 13 except that a branched low density polyethylene with an MI of 2.5 g/10 min and a density of 0.919 g/cc was substituted for an ethylene copolymer.

EXAMPLE 16

An alloy was prepared from 80 wt. % PVA (87 mole % hydrolyzed with a 4% aqueous solution viscosity at 20° C. of 5 cps) and 20 wt. % of an ethylene-acrylic acid copolymer (EAA-6.5 wt. % acrylic acid) by mixing in a Brabender mixer at 425° F. for 5 min.

EXAMPLE 17

An alloy was prepared from 85 wt. % of the PVA described in Example 16, 10 wt. % of the EAA described in Example 16, and 5 wt. % of the LLDPE described in Example 7 by mixing in a Brabender mixer at 425° F. for 15 min.

EXAMPLE 18

An alloy was prepared by mixing in a Brabender mixer at 425° F. for 10 minutes 90 wt. % of the PVA described in Example 16 and 10 wt. % of a zinc ionomer of ethylene-methacrylic acid in which 10.1 wt. % methacrylic acid is 70% neutralized.

EXAMPLE 19

An alloy was prepared by mixing in a Brabender mixer at 425° F. for 15 minutes 80 wt. % of the PVA described in Example 16 and 20 wt. % of the ionomer described in Example 18.

EXAMPLE 20

An alloy was prepared by mixing in a Brabender mixer at 425° F. for 5 minutes 80 wt. % of the PVA described in Example 16 and 20 wt. % of a polypropylene grafted with 0.23 weight % of maleic anhydride.

EXAMPLE 21

An alloy was prepared similarly to the procedure of Example 20 by using 80 wt. % of the PVA described in Example 16, 10 wt. % of the grafted polypropylene of Example 20 and 10 wt. % of either a block polypropylene (PP) polymer containing 5% ethylene or 10 wt. % of a random PP polymer containing 1.8% ethylene.

EXAMPLE 22

Similar alloys were prepared by substituting a PVA with a DP of 600 and 74 mole % hydrolysis for the PVA of Examples 20 and 21.

EXAMPLE 23

Varying percentages of PVA, as designated in Table VIII, below, and an ethylene-propylene (EP) elastomer containing 65 wt. % ethylene with a density of 0.86 g/cc were blended in an electrically heated scroll mixer at 425° F. (218° C.) for 5 min. at 120 rpm. Two macrophases were observed which were different in color and behavior. The smaller portion is indicated as separation percent in Table VIII. These data show that EP cannot be completely dispersed in PVA.

TABLE VIII

| Example 23 | | | |
|---|---|---|---|
| PVA "A" % | PVA "B" % | EP % | Separation % |
| 90 | — | 10 | 7.8 |
| — | 95 | 5 | 3.6 |
| — | 90 | 10 | 6.3 |
| — | 80 | 20 | 15.4 |

EXAMPLE 24

A number of alloys were prepared using PVA "A" and PVA "B" with an EP graft copolymer prepared by using an XMNA graft of the EP elastomer of Example 23 (0.8 wt. % XMNA, 0.04 MI). No separation occurred as shown in Table IX, below.

TABLE IX

| Example 24 | | | |
|---|---|---|---|
| PVA "A" % | PVA "B" % | EP graft % | Separation % |
| 90 | — | 10 | 0 |
| 80 | — | 20 | 0 |
| — | 90 | 10 | 0 |
| — | 80 | 20 | 0 |

EXAMPLE 25

85 wt. % PVA "A", 10 wt. % of the EP graft copolymer of Example 24 and 5 wt. % of a HDPE with a density of 0.949 and an HLMI of 20 were blended at 425° F. (218° C.) for 5 min. to yield an alloy.

EXAMPLE 26

In the same manner as described in Example 25, 70 wt. % of PVA "B", 10 wt. % of the EP graft copolymer of Example 24, and 10 wt. % of an LLDPE with a density of 0.918 and an MI of 2 yields an alloy.

All parts and percentages herein are by weight unless otherwise indicated.

GLOSSARY OF TERMS

Abbreviations used herein to identify chemical ingredients and product characteristics include:
DP—degree of polymerization
EP—ethylene-propylene elastomer
EAA—ethylene-acrylic acid copolymer
EVA—ethylene vinyl acetate copolymer
EVOH—ethylene vinyl alcohol copolymer
FTIR—Fourier Transform Infrared Spectroscopy
HDPE—high density polyethylene
HLMI—high load melt index
LLDPE—linear low density polyethylene
MA—maleic anhydride
MFR—melt flow rate
MI—melt index
$M_n$—number average molecular weight
$M_w$—weight average molecular weight
PE—polyethylene
PET—polyethylene terephthalate
PVA—polyvinyl alcohol
XMNA—x-methyl bicyclo(2.2.1)hept-5-ene-2,3-dicarboxylic anhydride The foregoing detailed description is given for clearness of understanding only, and no unnecessary limitations are to be inferred therefrom, as variations within the scope of the invention will be obvious to those skilled in the art.

We claim:

1. A melt processable polymer alloy prepared by the method comprising the steps of:
   (a) providing a polyvinyl alcohol polymer having a degree of hydrolysis of less than about 90 mole percent and a degree of polymerization of about 300 to 900, inclusive;
   (b) providing a functional polymer comprising a polyolefin or an ethylene-ester copolymer having functional groups reactive with the hydroxyl groups of said polyvinyl alcohol polymer incorporated therein by copolymerization, said functional groups comprising one or more of a carboxylic acid, a carboxylic acid anhydride, a metal salt of a carboxylic acid, or a derivative thereof; and,
   (c) thereafter reacting said polyvinyl alcohol polymer with less than a stoichiometric amount of said functional polymer to provide a mixture of grafted and ungrafted polyvinyl alcohol polymers, said grafted polyvinyl alcohol polymer having less than all available hydroxyl groups reacted with said functional groups, said polyvinyl alcohol polymer comprising at least about 70 weight percent of said mixture.

2. The alloy of claim 1 wherein said polyvinyl alcohol polymer is between about 70 and 90 mole percent hydrolyzed prior to reaction with said functional polymer.

3. The alloy of claim 1 wherein said functional polymer is an ethylene-acrylic acid copolymer, an ethylene-methacrylic acid copolymer, an ethylene-alkyl acrylate-acrylic acid copolymer, or an ethylene-alkyl methacrylate-methacrylic acid copolymer.

4. The alloy of claim 1 wherein said functional polymer is the partially neutralized salt of an ethylene-acrylic acid copolymer, an ethylene-methacrylic acid copolymer, an ethylene-alkyl acrylate-acrylic acid copolymer, or an ethylene-alkyl methacrylate-methacrylic acid copolymer.

5. The alloy of claim 1 which additionally contains a blending resin comprising an olefin homopolymer or copolymer compatible with said mixture of grafted and ungrafted polyvinyl alcohol polymers melt blended with said mixture.

6. The alloy of claim 5 wherein said alloy comprises between about 99 and 85 weight percent of said mixture of (c) and, correspondingly, between 1 and 15 weight percent of said blending resin.

7. The alloy of claim 1 formed into a gas barrier film, sheet, tube, coating, bottle or profile.

8. The alloy of claim 5 formed into a gas barrier film, sheet, tube, coating, bottle or profile.

9. An article formed of the alloy of claim 1 by one or more methods chosen from the group consisting of blown film extrusion, cast film extrusion, extrusion coating, coextrusion, coextrusion coating, injection molding, blow molding, rotomolding, compression molding, profile extrusion, pipe extrusion, and tubing extrusion.

10. An article formed of the alloy of claim 5 by one or more methods chosen from the group consisting of blown film extrusion, cast film extrusion, extrusion coating, coextrusion, coextrusion coating, injection molding, blow molding, rotomolding, compression molding, profile extrusion, pipe extrusion, and tubing extrusion.

11. A method of preparing a melt processable polymer alloy comprising the steps of:

(a) providing a polyvinyl alcohol polymer having a degree of hydrolysis of less than about 90 mole percent and a degree of polymerization of about 300 to 900, inclusive;

(b) providing a functional polymer comprising a polyolefin or an ethylene-ester copolymer having functional groups reactive with the hydroxyl groups of said polyvinyl alcohol polymer incorporated therein by copolymerization, said functional groups comprising one or more of a carboxylic acid, a carboxylic acid anhydride, a metal salt of a carboxylic acid, or a derivative thereof; and, (c) thereafter reacting said polyvinyl alcohol polymer with less than a stoichiometric amount of said functional polymer to provide a mixture of grafted and ungrafted polyvinyl alcohol polymers, said grafted polyvinyl alcohol polymer having less than all available hydroxyl groups reacted with said functional groups, said polyvinyl alcohol polymer comprising at least about 70 weight percent of said mixture.

12. The method of claim 11 wherein said polyvinyl alcohol polymer is between about 70 and 90 mole percent hydrolyzed prior to reaction with said functional polymer.

13. The method of claim 11 wherein said functional polymer is an ethylene-acrylic acid copolymer, an ethylene-methacrylic acid copolymer, an ethylene-alkyl acrylate-acrylic acid copolymer, or an ethylene-alkyl methacrylate-methacrylic acid copolymer.

14. The method of claim 11 wherein said functional polymer is the partially neutralized salt of an ethylene-acrylic acid copolymer, an ethylene-methacrylic acid copolymer, an ethylene-alkyl acrylate-acrylic acid copolymer, or an ethylene-alkyl methacrylate-methacrylic acid copolymer.

15. The method of claim 11 including the additional step of melt blending with said mixture of (c) a blending resin comprising an olefin homopolymer or copolymer compatible with said mixture of grafted and ungrafted polyvinyl alcohol polymers.

16. The method of claim 15 wherein said alloy comprises between about 99 and 85 weight percent of said mixture of (c) and, correspondingly, between 1 and 15 weight percent of said blending resin.

17. The method of claim 11 wherein said alloy is formed into a gas barrier film, sheet, tube, coating, bottle or profile.

18. The method of claim 15 wherein said alloy is formed into a gas barrier film, sheet, tube, coating, bottle or profile.

19. The method of claim 11 wherein said alloy is formed into an article by one or more methods chosen from the group consisting of blown film extrusion, cast film extrusion, extrusion coating, coextrusion, coextrusion coating, injection molding, blow molding, rotomolding, compression molding, profile extrusion, pipe extrusion, and tubing extrusion.

20. The method of claim 15 wherein said alloy is formed into an article by one or more methods chosen from the group consisting of blown film extrusion, cast film extrusion, extrusion coating, coextrusion, coextrusion coating, injection molding, blow molding, rotomolding, compression molding, profile extrusion, pipe extrusion, and tubing extrusion.

* * * * *